United States Patent
Graham et al.

(10) Patent No.: US 10,730,179 B2
(45) Date of Patent: Aug. 4, 2020

(54) ROBOTIC ARM ASSEMBLY CONSTRUCTION

(71) Applicant: General Electric Company, Schenectady, NY (US)

(72) Inventors: Andrew Crispin Graham, Badminton (GB); Jason Curle, Wotton under Edge (GB); Trevor Hawke, Bristol (GB)

(73) Assignee: General Electric Company, Schenectady, NY (US)

( * ) Notice: Subject to any disclaimer, the term of this patent is extended or adjusted under 35 U.S.C. 154(b) by 136 days.

(21) Appl. No.: 15/991,053

(22) Filed: May 29, 2018

(65) Prior Publication Data

US 2019/0366536 A1    Dec. 5, 2019

(51) Int. Cl.
| | | |
|---|---|---|
| *B25J 9/10* | (2006.01) | |
| *B25J 9/00* | (2006.01) | |
| *B25J 9/06* | (2006.01) | |
| *B25J 18/06* | (2006.01) | |
| *B25J 9/16* | (2006.01) | |

(52) U.S. Cl.
CPC .......... *B25J 9/1065* (2013.01); *B25J 9/0021* (2013.01); *B25J 9/065* (2013.01); *B25J 18/06* (2013.01); *B25J 9/1694* (2013.01)

(58) Field of Classification Search
CPC ........ B25J 9/1065; B25J 9/0021; B25J 9/065; B25J 18/06; B25J 9/1694
See application file for complete search history.

(56) References Cited

U.S. PATENT DOCUMENTS

| | | | | |
|---|---|---|---|---|
| 3,266,059 A | * | 8/1966 | Stelle | B25J 18/06 623/62 |
| 3,274,850 A | * | 9/1966 | Tascio | F16C 1/28 74/502.3 |
| 3,631,737 A | * | 1/1972 | Wells | B25J 9/06 74/469 |
| 4,393,728 A | * | 7/1983 | Larson | B25J 9/06 74/469 |
| 4,712,969 A | | 12/1987 | Kimura | |
| 4,751,821 A | * | 6/1988 | Birchard | A61F 2/58 60/527 |
| 4,815,911 A | * | 3/1989 | Bengtsson | B25J 9/06 414/7 |
| 4,848,179 A | | 7/1989 | Ubhayakar | |
| 5,317,952 A | * | 6/1994 | Immega | B25J 9/104 74/490.04 |
| 5,816,769 A | | 10/1998 | Bauer et al. | |
| 5,857,815 A | | 1/1999 | Bailey et al. | |
| 6,773,327 B1 | * | 8/2004 | Felice | A63H 13/02 446/330 |
| 6,858,005 B2 | * | 2/2005 | Ohline | A61B 1/0053 600/139 |
| 6,917,176 B2 | * | 7/2005 | Schempf | G01M 3/005 318/568.11 |
| 7,543,518 B2 | * | 6/2009 | Buckingham | B25J 9/06 74/490.04 |

(Continued)

Primary Examiner — David M Fenstermacher
(74) Attorney, Agent, or Firm — Dority & Manning, P.A.

(57) ABSTRACT

A method is provided for constructing a robotic arm including a plurality of links and a rope assembly. The method includes providing the rope assembly having a rope with a plurality of rope bearings threaded thereon; and attaching the plurality of rope bearings of the rope assembly to the plurality of links of the robotic arm.

20 Claims, 8 Drawing Sheets

(56) References Cited

U.S. PATENT DOCUMENTS

| | | | |
|---|---|---|---|
| 8,126,591 B2 | 2/2012 | Buckingham et al. | |
| 8,182,418 B2 * | 5/2012 | Durant | A61B 1/0055 600/141 |
| 8,205,522 B2 * | 6/2012 | Buckingham | B25J 9/06 74/490.04 |
| 8,568,299 B2 * | 10/2013 | Eno | A61B 1/00039 600/117 |
| 8,571,711 B2 * | 10/2013 | Jacobsen | B08B 9/045 180/9.21 |
| 8,882,657 B2 * | 11/2014 | Ohline | A61B 1/005 600/117 |
| 9,073,204 B2 | 7/2015 | Isobe et al. | |
| 9,220,398 B2 * | 12/2015 | Woodley | A61B 1/0053 |
| 9,511,496 B2 | 12/2016 | Sarh et al. | |
| 9,610,686 B2 | 4/2017 | Song et al. | |
| 9,981,392 B2 * | 5/2018 | Kim | B25J 18/06 |
| 2004/0195988 A1 | 10/2004 | Buckingham et al. | |
| 2013/0061710 A1 | 3/2013 | Long | |
| 2015/0068350 A1 | 3/2015 | Kirihara et al. | |

* cited by examiner

ROBOTIC ARM ASSEMBLY CONSTRUCTION

FIELD

The present subject matter relates generally to a system and method for constructing a robotic arm assembly, and more specifically a robotic arm of a robotic arm assembly.

BACKGROUND

Robotic arm assemblies are useful throughout various industries for performing operations at, e.g., remote locations, hazardous locations, etc. At least certain robotic arm assemblies include a robotic arm formed of a plurality of links joined together at respective joints. Additionally, a plurality of control wires may extend through the robotic arm, with each wire terminating at an individual link for moving such link relative to an aft-adjacent link. The control wires may be coupled to one or more motors within a base of the robotic arm assembly, such that the robotic arm assembly may control a movement of the robotic arm by increasing and/or decreasing tension on the plurality of control wires.

In order to form such a robotic arm of the robotic arm assembly, each of the individual links are typically separately formed, and individual holes are extruded or drilled for each of the plurality of control wires. The control wires are then threaded through the extruded or separately drilled holes in the links. Such a construction method, however, may make it difficult to construct relatively long and/or relatively thin robotic arms. Specifically, with such a construction method, it may be difficult to thread each of the control wires through each of the plurality of links of the robotic arm, particularly when a relatively dense concentration of control wires is desired, such that the control wires are relatively thin. Further, in the event of a failure of one of the control wires, it may be difficult to replace such control wire.

Accordingly, a method for constructing a robotic arm assembly allowing for increased ease of construction and/or repair would be useful.

BRIEF DESCRIPTION

Aspects and advantages of the invention will be set forth in part in the following description, or may be obvious from the description, or may be learned through practice of the invention.

In one aspect of the present disclosure, a method is provided for constructing a robotic arm including a plurality of links and a rope assembly. The method includes providing the rope assembly having a rope with a plurality of rope bearings threaded thereon; and attaching the plurality of rope bearings of the rope assembly to the plurality of links of the robotic arm.

In certain exemplary aspects providing the rope assembly having the rope with the plurality of rope bearings threaded thereon includes threading the plurality of rope bearings on the rope prior to attaching the plurality of rope bearings of the rope assembly to the plurality of links of the robotic arm.

In certain exemplary aspects attaching the plurality of rope bearings of the rope assembly to the plurality of links of the robotic arm includes removably coupling the plurality of rope bearings of the rope assembly to the plurality of links of the robotic arm.

In certain exemplary aspects providing the rope assembly having the rope with the plurality of rope bearings threaded thereon includes providing a plurality of rope assemblies, with each rope assembly including a rope with a respective plurality of rope bearings threaded thereon, and wherein attaching the plurality of rope bearings of the rope assembly to the plurality of links of the robotic arm includes attaching the plurality of rope bearings of each rope assembly of the plurality of rope assemblies to the plurality of links of the robotic arm.

For example, in certain exemplary aspects the plurality of rope assemblies includes at least 6 rope assemblies.

In certain exemplary aspects the plurality of links includes a forward link and an aft link, wherein the forward link includes a bracket, wherein the aft link also includes a bracket, and wherein attaching the plurality of rope bearings of the rope assembly to the plurality of links of the robotic arm includes attaching a first rope bearing to the bracket of the forward link, and attaching a second rope bearing to the bracket of the aft link.

In certain exemplary aspects the rope includes an anchor fixedly coupled to an end of the rope, and wherein the method further includes attaching the anchor to one link of the plurality of links.

In certain exemplary aspects the plurality of links includes a respective plurality of brackets, wherein attaching the plurality of rope bearings of the rope assembly to the plurality of links of the robotic arm includes attaching the rope bearings of the rope assembly to the respective plurality of brackets of the plurality of links.

In certain exemplary aspects attaching the plurality of rope bearings of the rope assembly to the plurality of links of the robotic arm includes attaching a first rope bearing to a first bracket of a first link of the plurality of links.

For example, in certain exemplary aspects attaching the first rope bearing to the first bracket of the first link of the plurality of links includes moving the first rope bearing at least partially into a bracket opening of the first bracket and attaching a bracket cap to a bracket base to removably couple the first rope bearing to the first link.

For example, in certain exemplary aspects attaching the first rope bearing to the first bracket of the first link of the plurality of links includes moving the first rope bearing at least partially into a bracket opening of the first bracket and attaching a lock to the first rope bearing to removably couple the first rope bearing to the first link.

For example, in certain exemplary aspects the rope assembly includes a plurality of ropes extending through the first rope bearing, and wherein attaching the first rope bearing to the first bracket of the first link of the plurality of links includes attaching the first rope bearing having the plurality of ropes of the rope assembly extending therethrough to the first bracket of the first link.

In an exemplary embodiment of the present disclosure, a robotic arm is provided. The robotic arm includes a plurality of links moveably coupled to one another, the plurality of links collectively including a plurality of brackets; and a rope assembly including a rope and a plurality of bearings threaded thereon, each bearing of the plurality of bearings removably coupled to one bracket of the plurality of brackets of the plurality of links.

In certain exemplary embodiments each link extends between a forward end and an aft end, and wherein the plurality of brackets includes a forward bracket at the forward end of each link and an aft bracket at the aft end of each link.

In certain exemplary embodiments the plurality of links includes a first link, wherein the plurality of brackets of the plurality of links includes a forward bracket positioned at a forward end of the first link, wherein the forward bracket defines a forward bracket opening, wherein a first bearing of the plurality of bearings of the rope assembly is positioned within the forward bracket opening.

For example, in certain exemplary embodiments the forward bracket includes a cap and a base, wherein the base defines at least in part the forward bracket opening, and wherein the cap is removably coupled to the base for removably coupling the first bearing to the forward bracket.

For example, in certain exemplary embodiments the first bearing includes a body and a lock, wherein the lock is removably coupled to the body for removably coupling the first bearing to the forward bracket.

For example, in certain exemplary embodiments the body of the first bearing extends between a first end and a second end, wherein the body of the first bearing includes a head at the first end and defines a groove at the second end, and wherein the lock is removably positioned within the groove.

For example, in certain exemplary embodiments the bracket defines a plurality of bracket openings, and wherein the robotic arm further includes a plurality of rope assemblies, wherein each rope assembly includes a bearing removably positioned in one of the plurality of bracket openings of the bracket.

In certain exemplary embodiments the rope assembly includes a plurality of ropes, wherein the plurality of links includes a first link defining a circumferential direction, wherein the plurality of brackets includes a first bracket positioned on the first link and defining a plurality of openings spaced along the circumferential direction, and wherein the plurality of ropes extend through the plurality of openings of the first bracket.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a component or system, and refer to the normal operational attitude of the component or system. For example, with regard to a robotic arm, forward refers to a position closer to a distal end of the robotic arm and aft refers to a position closer to a root end of the robotic arm.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
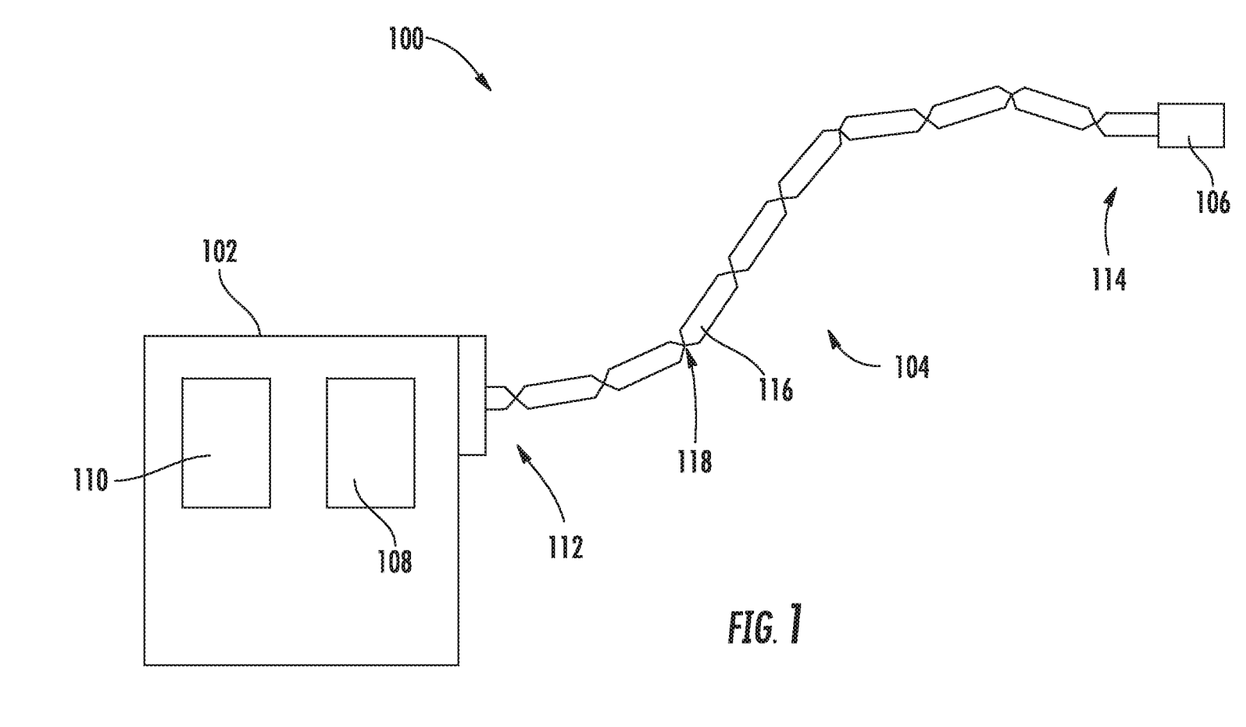
FIG. 1 is a schematic, cross-sectional view of a robotic arm assembly in accordance with an exemplary embodiment of the present disclosure.

Referring now to the drawings, wherein identical numerals indicate the same elements throughout the Figs., FIG. 1 is a schematic view of a robotic arm assembly 100 in accordance with an exemplary embodiment of the present disclosure. The exemplary robotic arm assembly 100 depicted generally includes a support assembly 102, a robotic arm 104, and a utility member 106. The support assembly 102 generally includes one or more motors 108 and a controller 110. The controller 110 is operably coupled to the one or more motors 108 for controlling operation of the robotic arm assembly 100. Additionally, the controller 110 may be operably coupled to the utility member 106 and/or one or more sensors (not shown) attached to or embedded in the robotic arm 104 and/or utility member 106. Further, the robotic arm 104 extends generally between a root end 112 and a distal end 114. The robotic arm 104 is coupled to the support assembly 102 at the root end 112 and includes the utility member 106 at the distal end 114.

Moreover, the robotic arm 104 of the exemplary robotic arm assembly 100 depicted is generally formed of a plurality of links 116 and a plurality of joints 118, with the plurality of links 116 sequentially arranged and movably coupled to one another with the plurality of joints 118.

Briefly, it will be appreciated that the robotic arm 104 may define certain parameters to further enable it to reach the relatively remote positions within, e.g., an interior of a gas turbine engine or other remote locations of an environment. More specifically, for the embodiment shown, the robotic arm 104 defines a length between the root end 112 in the distal end 114 of least about thirty-six (36) inches, such as at least about forty-eight (48) inches, such as at least about sixty (60) inches, such as up to about 600 inches. Similarly, the robotic arm 104 defines a maximum diameter between the root end 112 and the distal end 114, which for the embodiment depicted is a maximum diameter of each of the individual segments 118 of the robotic arm 116, less than about five (5) inches. For example, the maximum diameter of the robotic arm 104 may be less than about three (3) inches, such as less than about 2.5 inches, such as less than about one (1) inch. Such may further allow the robotic arm 104 to reach the relatively remote locations desired.

Figure 2:
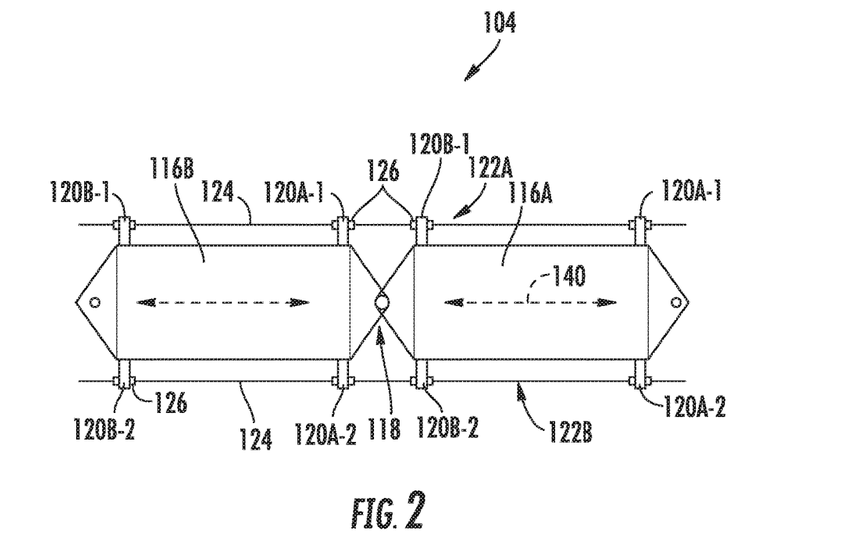
FIG. 2 is a close-up, schematic view of a section of a robotic arm of the exemplary robotic arm assembly of FIG. 1.

Referring now also to FIG. 2, a close-up, schematic view is provided of an adjacent pair of links 116 (i.e., a forward link 116A and an aft link 116B) and a joint 118 of the exemplary robotic arm 104 of FIG. 1. Notably, for the exemplary embodiment depicted, the joint 118 between the forward link 116A and the aft link 116B is configured as a ball joint allowing for at least three degrees of freedom between the forward and aft links 116A, 116B. However, in other embodiments, any other suitable joint 118 may be provided to allow for any other suitable number of degrees of freedom. For example, in other embodiments, the joint 118 may be configured as a flexural joint (e.g., a narrowed portion of a continuous material forming the plurality of links and joint), a roller joint, a pair of roller joints, etc. and such joints may have anywhere between one and six degrees of freedom.

As will be appreciated, the plurality of links 116 further include a plurality of brackets 120 and the robotic arm 104 further includes a rope assembly 122, or rather a plurality of rope assemblies 122, with each rope assembly 122 removably coupled to at least one of the links 116 via the plurality of brackets 120 of the links 116. More specifically, for the embodiment depicted each link 116 includes a forward bracket 120A and an aft bracket 120B, and more specifically, still, a first forward bracket 120A-1, a second forward bracket 120A-2, a first aft bracket 120B-1, and a second aft bracket 120B-2. Accordingly, the forward link 116A and aft link 116B each include at least these four brackets 120A-1, 120B-1, 120A-2, 120B-2. Additionally, the plurality of rope assemblies 122 includes a first rope assembly 122A and a second rope assembly 122B. The first rope assembly 122A is removably coupled to the first forward and aft brackets 120A-1, 120B-1 of the forward link 116A and the first forward and aft brackets 120A-1, 120B-1 of the aft link 116B, and similarly, the second rope assembly 122B is removably coupled to the second forward and aft brackets 120A-2, 120B-2 of the forward link 116A and the second forward and aft brackets 120A-2, 120B-2 of the aft link 116B. Notably, however, in other exemplary embodiments, each link 116 may only include a single bracket 120 for each rope assembly 122, such that a single bearing 126 of each rope assembly 122 is coupled to each link 116. Such may be the case, e.g., when the links 116 are not particularly long, and/or where the links 116 are not expected to flex substantially relative to the forward and aft adjacent links 116.

Figure 3:
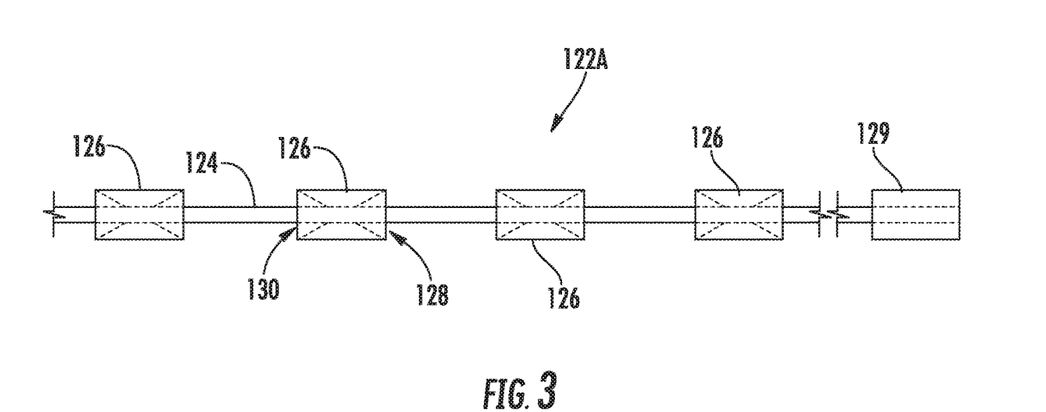
FIG. 3 is a schematic view of a rope assembly in accordance with an exemplary embodiment of the present disclosure.

Referring now also briefly to FIG. 3, providing a close-up view of the first rope assembly 122A, it will be appreciated that the first rope assembly 122A generally includes a rope 124 and a plurality of bearings 126 threaded thereon. Specifically, the section of the first rope assembly 122A depicted in FIG. 3 includes four bearings 126 threaded thereon, with each bearing 126 generally defining a flared forward section 128 and a flared aft section 130 (each depicted in phantom) for reducing an amount of friction on the rope 124 extending/threaded therethrough during operation of the robotic arm 104 (preventing or limiting damage to both the rope 124 and the material forming the bearing 126). It will be appreciated that as used herein the term "rope" may refer to any of a rope, wire, line, etc. capable of performing the functions described herein. It will also be appreciated that in other embodiments, one or both of the forward section 128 and aft section 124 may not be flared. Specifically, in at least certain embodiments, only one of the forward section 128 or the aft section 124 of the bearing 126 may be flared to accommodate an expected rope deflection.

As will be appreciated from FIGS. 2 and 3, each of the four bearings 126 of the first rope assembly 122A depicted in FIG. 3 is removably coupled to one of the brackets 120 of the forward and aft links 116A, 116B in FIG. 3. Specifically, one of the four bearings 126 of the first rope assembly 122A is removably coupled to the first forward bracket 120A-1 of the forward link 116A, the first aft bracket 120B-1 of the forward link 116A, the first forward bracket 120A-1 of the aft link 116B, and the first aft bracket 120B-1 of the aft link 116B. In such a manner, it will be appreciated that the first rope assembly 122A may be installed as the unit to an otherwise assembled robotic arm 104, and similarly may be replaced as a unit in the event of a failure of, e.g., one or more of the bearings 126 or the rope 124 of the first rope assembly 122A.

Moreover, for the embodiment depicted, the first rope assembly 122A includes an anchor 129 fixed to an end of the rope 124 (see FIG. 3). As will be appreciated, the anchor 129 may also be coupled to a bracket 120 of a link 116 in the same manner that the exemplary bearings 126 of the rope assembly 122 are attached to the brackets 120. However, the anchor 129 is fixed to the rope 124 (such that the rope 124 may not slide therethrough), and in such a manner couples the rope 124 to the respective link 116 such that increasing or decreasing a tension in the rope 124 may control a movement of the link 116.

It should also be appreciated that by having the bearings 126 of the rope assemblies 122 removably coupled to the links 116 (via the brackets 120 for the embodiments shown), as opposed to being formed integrally with the links 116 as has been done in the past, the bearings 126 may be formed of a different material than the links 116 and brackets 120. For example, the bearings 126 may be formed of a material designed to allow for a relatively low friction movement of the ropes 124 therethrough, without wearing prematurely. By contrast, the links 116 may be formed of a material designed to withstand the tension and compression forces of the robotic arm 104, while also meeting any weight requirements. For example, in at least one embodiment, the bearings 126 may be formed of a metal material, while the links 116 may be formed of a plastic, or plastic polymer material. Of course, in other embodiments, any other suitable materials may be used.

Further, although not depicted in close-up detail, it will be appreciated that the second rope assembly 122B is a similarly configured as the first rope assembly 122A. Accordingly, the second rope assembly 122B may also be installed as a unit to an otherwise assembled robotic arm 104, and also may be replaced as a unit in the event of a failure of, e.g., one or more of the bearings 126 or rope 124 of the second rope assembly 122B. Further, although the exemplary section of the robotic arm 104 depicted in FIG. 2 includes only two links 116, in other embodiments, one or both of the first or second rope assemblies 122A, 122B may extend along any suitable number of the links 116. Further, as will be appreciated from one or more of the embodiments described below, although only two rope assemblies 122 are depicted in FIG. 2 (i.e., the first rope assembly 122A and the second rope assembly 122B), in other exemplary embodiments, the robotic arm 104 may include any other suitable number of rope assemblies 122. For example, as noted the rope assemblies 122 may each further include an anchor 129 which fixes the rope 124 of the rope assembly 122 to a particular link 116. Two or more rope assemblies 122 may terminate at a particular link 116, such that increasing tension on a rope 124 of one rope assembly 122, and decreasing tension on a rope 124 of another, corresponding rope assembly 122 may cause the link 116 to move relative to an aft-adjacent link 116. In certain embodiments, each link 116 of the plurality of links 116 of the robotic arm 104 may have two or more corresponding rope assemblies 122 terminating at the link 116 for controlling the link 116. Alternatively, in other embodiments, two or more links 116 of the plurality of links 116 may be configured to move together, such that each of said links 116 does not include individual corresponding rope assemblies 122 terminating at such link 116. The tension may be increased or decreased using the one or more motors 108 of the support assembly 102.

As will be appreciated from FIGS. 2 and 3, each bearing 126 of the first rope assembly 122A and the second rope assembly 122B may be removably coupled to the respective brackets 120 of the links 116 in any suitable manner. For example, referring now to FIGS. 4 through 6, one embodiment of a bracket 120 configured to removably couple a bearing 126 to a link 116 is provided. For example, in one embodiment, the exemplary bracket 120 depicted in FIGS. 4 through 6 may be the first, forward bracket 120A-1 of the forward link 116A of the robotic arm 104 depicted in FIG. 2, and the rope assembly 122 depicted may be the first rope assembly 122A depicted in FIG. 2. Of course, other brackets 120 of the links 116 may also or alternatively be configured in accordance with the embodiment described.

Figure 4:
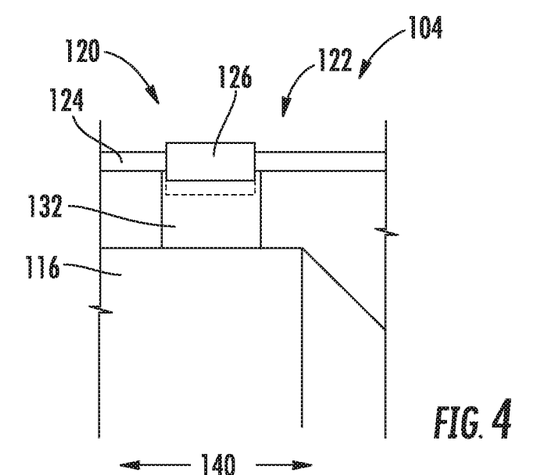
FIG. 4 is a schematic view of a bearing of a rope assembly and a bracket of a link in accordance with an exemplary embodiment of the present disclosure in a first attachment phase.
Figure 5:
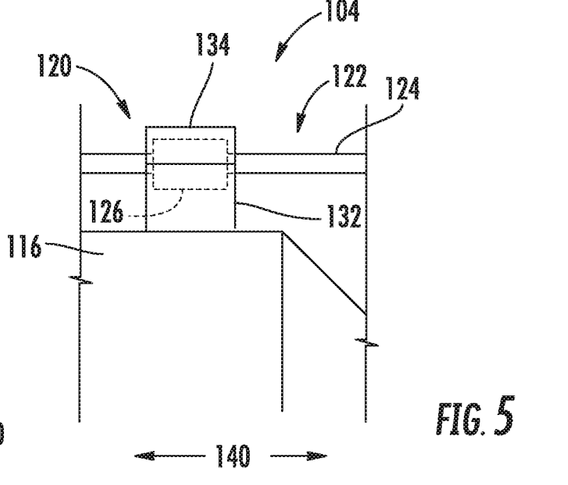
FIG. 5 is a schematic view of the exemplary bearing and bracket of FIG. 4 in a second attachment phase.
Figure 6:
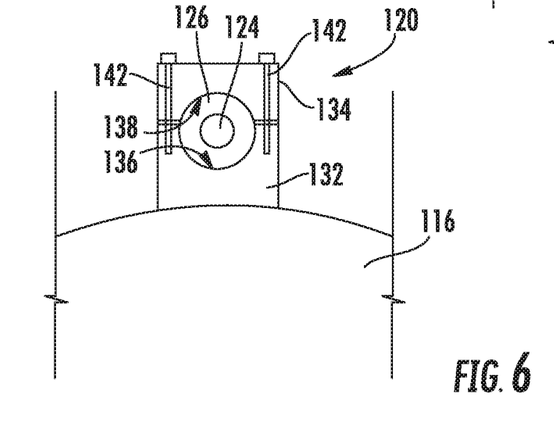
FIG. 6 is a schematic view of the exemplary bearing and bracket of FIG. 4 along a lengthwise direction of the exemplary link.

As will be appreciated from FIGS. 4 through 6, the bracket 120 generally includes a bracket base 132 and a bracket cap 134 (FIGS. 5 and 6). The bracket base 132 defines a first bracket channel 136 for at least partially receiving the bearing 126 of the rope assembly 122 (FIG. 6). The bracket cap 134 similarly defines a second bracket channel 138 for positioning over at least a portion of the bearing 126 of the rope assembly 122 (FIG. 6). Notably, for the embodiment depicted, the first bracket channel 136 extends along an entire length of the bracket base 132 and second bracket channel 138 of the bracket cap 134 extends along an entire length of the bracket cap 134 (the lengths of each of the bracket base 132 and bracket cap 134 defined along a lengthwise axis 140 of the link 116). Also, for the embodiment depicted, the bracket base 132 and bracket cap 134 are each longer, along the lengthwise axis 140 of the forward link 116A, than the bearing 126. It will be appreciated, however, that in other embodiments, the first bracket channel 136 and second bracket channel 138 may not extend along the entire length of the bracket base 132 and bracket cap 134, respectively, or alternatively, in other embodiments, the bearing 126 may be longer along the lengthwise axis 140 of the forward link 116A than one or both of the bracket base 132 and bracket cap 134.

Referring particularly to FIG. 6, providing a forward end view of the bracket 120, it will be appreciated that for the embodiment depicted, the bearing 126 defines a substantially circular cross-sectional shape. Similarly, the first bracket channel 136 and second bracket channel 138 of the bracket base 132 and bracket cap 134, respectively, together form a corresponding shape to the cross-sectional shape of the bearing 126, which again is a circular cross-sectional shape for the embodiment depicted. The bracket cap 134 may be bolted or otherwise mechanically and removably affixed to the bracket base 132 to clamp the bearing 126 of the rope assembly 122 in position. In such a manner, the bearing 126 is removably coupled to the forward link 116A through the bracket 120 depicted. For example, the embodiment depicted uses a pair of bolts 142, however, other embodiments may utilize any suitable number or configuration of mechanical attachment features.

It will be appreciated, however, that in other exemplary embodiments, the robotic arm 104, and more specifically, the plurality of brackets 120 and rope assembly(ies) 122 may have any other suitable configuration.

Figure 7:
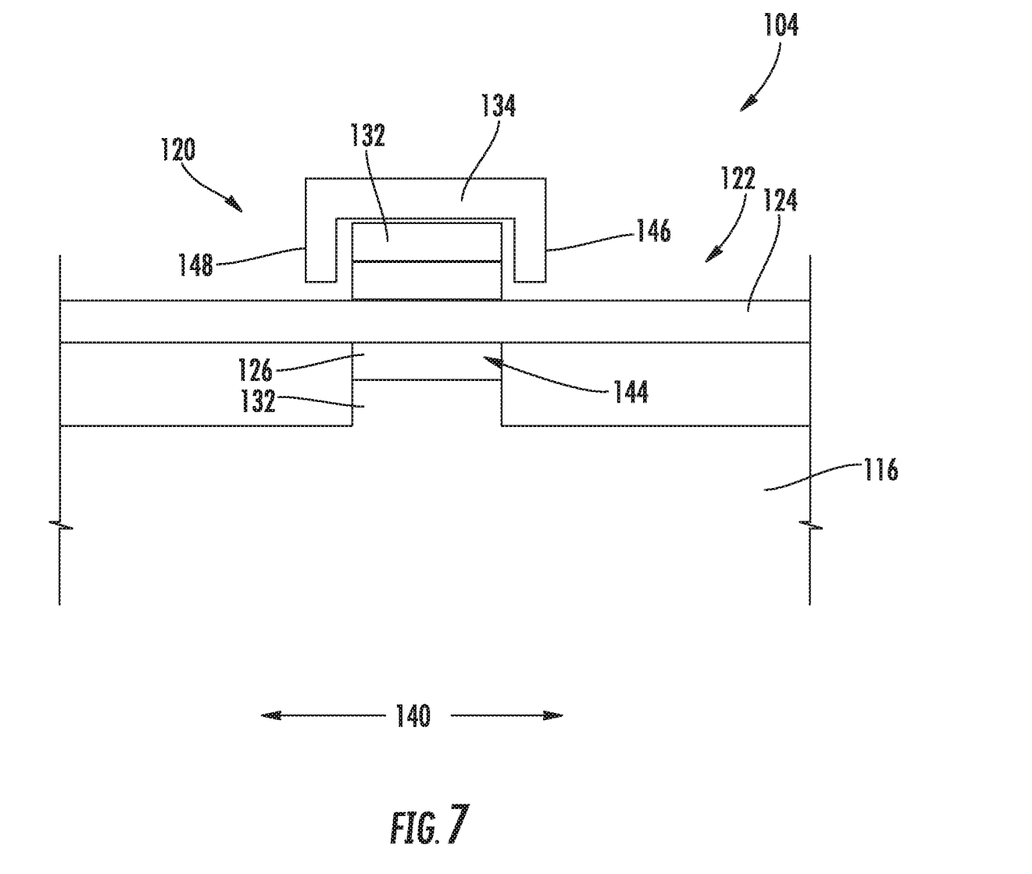
FIG. 7 is a schematic view of a rope assembly and a link of a robotic arm in accordance with another exemplary embodiment of the present disclosure.

For example, referring briefly to FIG. 7, a cross-sectional view of a bracket 120 in accordance with another exemplary embodiment of the present disclosure is provided including a bearing 126 removably coupled thereto. For the embodiment depicted, the bracket 120 generally includes a bracket base 132 defining an opening 144 extending along a length thereof (and along a longitudinal axis 140 of the link 116), having a cross-sectional shape corresponding to a cross-sectional shape of the bearing 126 (e.g., each may define a similar circular cross-sectional shape). In such a manner, it will be appreciated that the bearing 126 may be slidably received within the opening 144 of the bracket base 132 (i.e., slidable along the axis 140 of the link 116/axis of the opening of the bracket base 132, not labeled). For the embodiment depicted, in order to removably fix the bearing 126 of the rope assembly 122 to the bracket 120, the bracket 120 further includes a bracket cap 134. The bracket cap 134 includes a forward flange 146 and an aft flange 148 extending over a forward and aft end, respectively, of the opening 144 of the bracket base 132. The bracket cap 134 may be removably coupled to the bracket base 132, e.g., by one or more screws, bolts, magnets, etc. (similar to the embodiment of, e.g., FIG. 6). In such a manner, the bearing 126 of the rope assembly 122 may be removably coupled to the bracket 120, and accordingly, removably coupled to the link 116.

Additionally, in still other embodiments, any other suitable configuration may be provided for the robotic arm 104, and more specifically, for the plurality of brackets 120 and rope assembly(ies) 122. For example, referring now to FIGS. 8 through 10, a bracket 120 of a link 116 of a robotic arm 104 and corresponding rope assemblies 122 in accordance with another exemplary embodiment of the present disclosure are depicted.

Figure 8:
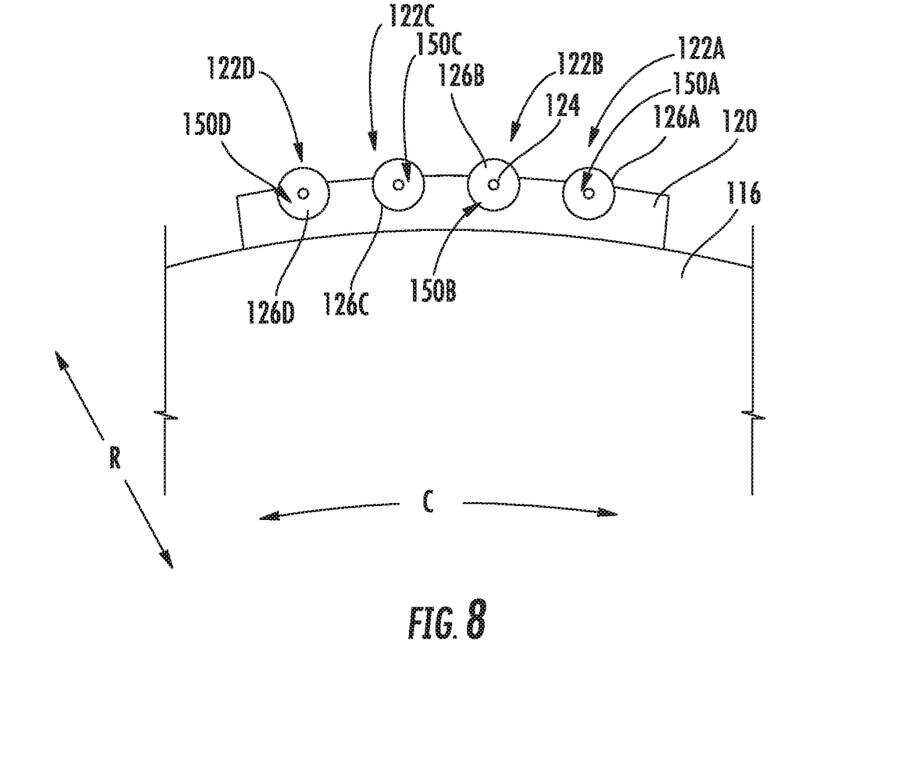
FIG. 8 is a schematic view of a plurality of rope assemblies and a link of a robotic arm in accordance with yet another exemplary embodiment of the present disclosure.

Referring first to FIG. 8, it will be appreciated that the bracket 120, which may be positioned on the link 116 of the robotic arm 104 at a similar location as one or more of the exemplary brackets 120 described above with reference to FIG. 2 (e.g., the first forward bracket 120A-1 of the forward link 116A), is configured for receiving a plurality of bearings 126 from a plurality of different rope assemblies 122. Specifically, the exemplary bracket 120 depicted in FIG. 8 defines a plurality of openings 150 spaced along a circumferential direction C of the link 116 (i.e., a direction extending about a longitudinal axis 140 of the link 116; see FIGS. 9 and 10, below), with each opening 150 configured to receive an individual bearing 126 of an separate rope assembly 122. More specifically, for the embodiment of FIG. 8, the bracket 120 defines four openings 150 (e.g., openings 150A, 150B, 150C, and 150D) spaced along the circumferential direction C for receiving four individual bearings 126 (e.g., 126A, 126B, 126C, 126D) of four respective, separate rope assemblies 122 (e.g., 122A, 122B, 122C, 122D). Notably, for the embodiment depicted, each of the individual bearings 126 may be slidable along the longitudinal axis 140 of the link 116 into a respective opening 150 of the bracket 120. For example, for the embodiment depicted each bracket 120 is shaped to constrain the bearings 126 along a radial direction R of the link 116, but allow for at least some movement along the longitudinal axis 140 of the link 116.

Figure 9:
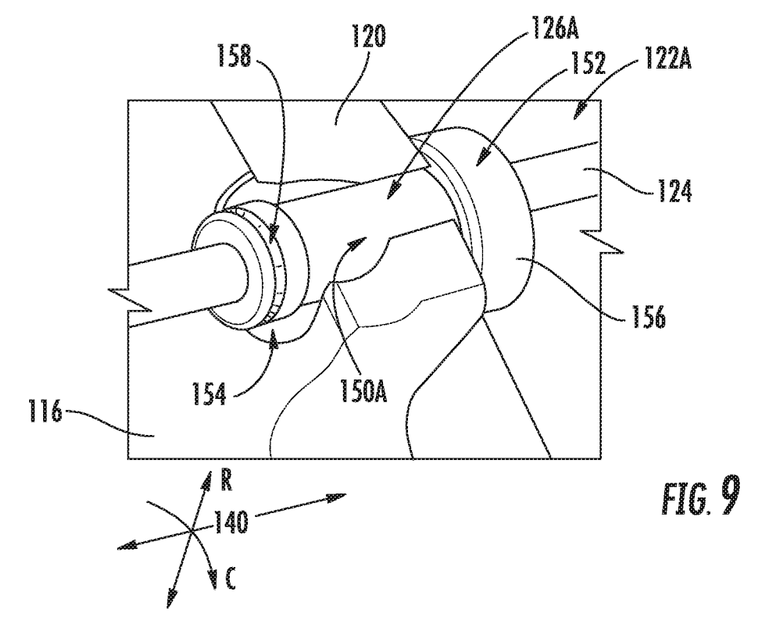
FIG. 9 is a perspective view of a bearing of a rope assembly of the plurality of exemplary rope assemblies and the exemplary link of FIG. 8 in a first attachment phase.
Figure 10:
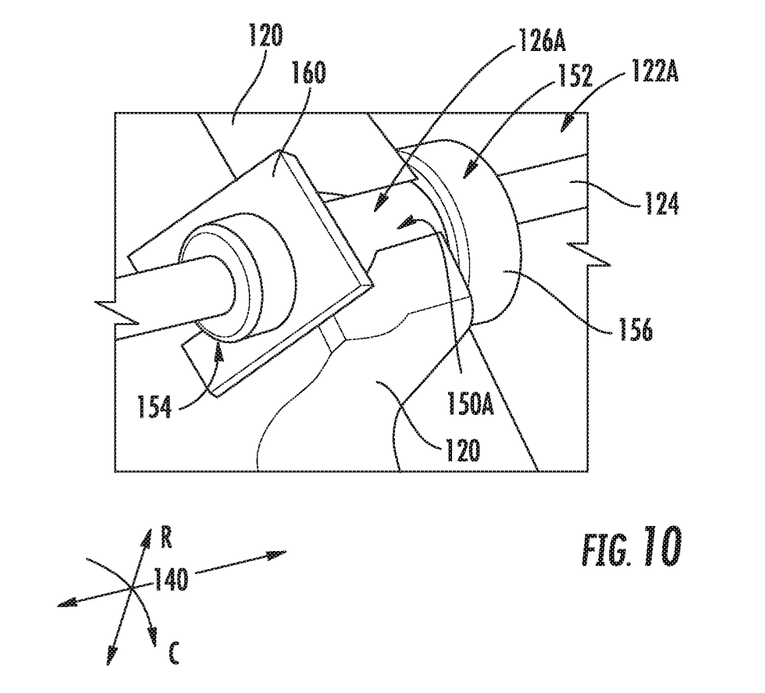
FIG. 10 is a perspective view of the bearing of the rope assembly of the plurality of exemplary rope assemblies and the exemplary link of FIG. 8 in a second attachment phase.

More particularly, referring now to FIG. 9, it will be appreciated that the exemplary bearing 126 depicted (e.g., the first bearing 126A of FIG. 8) defines a nonuniform shape along the length of the bearing 126 (which is in alignment with the axis 140 of the link 116 once installed in the bracket 120). Specifically, for the embodiment shown, the exemplary bearing 126 extends between a first end 152 and a second end 154. At the first end 152 of the exemplary bearing 126, the exemplary bearing 126 includes a bearing head 156 defining a width greater than a width of the corresponding opening 150A in the bracket 120. At the second end 154 of the exemplary bearing 126, the exemplary bearing 126 includes a groove 158, and more particularly, a circumferential groove. Referring now to FIG. 10, once the bearing 126 is positioned within the respective opening 150 of the bracket 120, a lock 160 of the bearing 126 may be installed within the groove 158 of the bearing 126. The lock 160, similar to the bearing head 156, defines a width greater than the width of the corresponding opening 150 in the bracket 120. In such a manner, once the lock is installed, the bearing 126 is removably coupled to the bracket 120, and accordingly is also removably coupled to the corresponding link 116.

Notably, for the embodiment depicted, the lock 160 is configured as a C-clip that attaches to the groove 156 at the second end 154 of the bearing 126. However, in other embodiments, the lock 160 may instead be a wire bar that couples to the groove 156, or any other suitable geometry for constraining the bearing 126 along a length of the bracket 120. Additionally, while the configuration depicted and described with reference to FIGS. 8 through 10 includes a bracket 120 for mounting four separate rope assemblies 122, in other exemplary embodiments, the bracket 120 may be configured to instead mount any other suitable number of rope assemblies 122 (e.g, 2, 3, 5, 6, 7, 8, 9, 10, or up to 50), or alternatively may mount a single rope assembly 122. Similarly, although the embodiments described above with reference to FIGS. 4 through 6 and FIG. 7 are depicted mounting a single rope assembly 122, in other embodiments, one or more of these embodiments may mount a plurality of rope assemblies 122.

Further, in still other embodiments, any other suitable configuration may be provided for the robotic arm 104, and more specifically, the plurality of brackets 120 and rope assembly(ies) 122. For example, referring now to FIGS. 11 and 12, a bracket 120 of a link 116 of a robotic arm 104 and corresponding rope assembly 122 in accordance with another exemplary embodiment of the present disclosure is depicted. In certain exemplary embodiments, the robotic arm 104 may be configured in a similar manner to the exemplary robotic arm 104 described above with reference to FIGS. 1 and 2.

As with the embodiment above, the robotic arm 104 further includes a rope assembly 122. Specifically, for the embodiment of FIG. 11, the robotic arm 104 includes a first rope assembly 122A and a second rope assembly 122B. However, by contrast to the exemplary rope assemblies 122 described above, for the embodiment depicted, the first and second rope assemblies 122 each include a plurality of ropes 124. Specifically, with reference to the first rope assembly 122A, the first rope assembly 122A includes a bearing 126, with the bearing 126 having a plurality of openings 162 circumferentially spaced (i.e., spaced along a circumferential direction C of the link 116 when coupled to the link 116), with each opening 162 including an individual rope 124 extending therethrough. Specifically, for the embodiment depicted, the bearing 126 of the first rope assembly 122A includes nine openings 162 circumferentially spaced from one another, and nine individual ropes 124, each individual rope 124 extending through a respective opening 162. The bearing 126 is removably coupled to a first bracket 120A (depicted in phantom in FIG. 11) on the link 116, and more specifically, the first bracket 120A is configured as a slotted bracket having one or more attachment points 164 and defining one or more slots 166 for the plurality of ropes 124 to extend through. As is represented schematically, for the embodiment of FIG. 11, the first bracket 120A includes two attachment points 164 whereby the bearing 126 of the first rope assembly 122A may be removably coupled to such first bracket 120A. For example, the bearing 126 may be removably coupled to the first bracket 120A using a mechanical attachment, such as, one or more bolts, screws, clamps, etc. at the attachment points 164.

Figure 11:
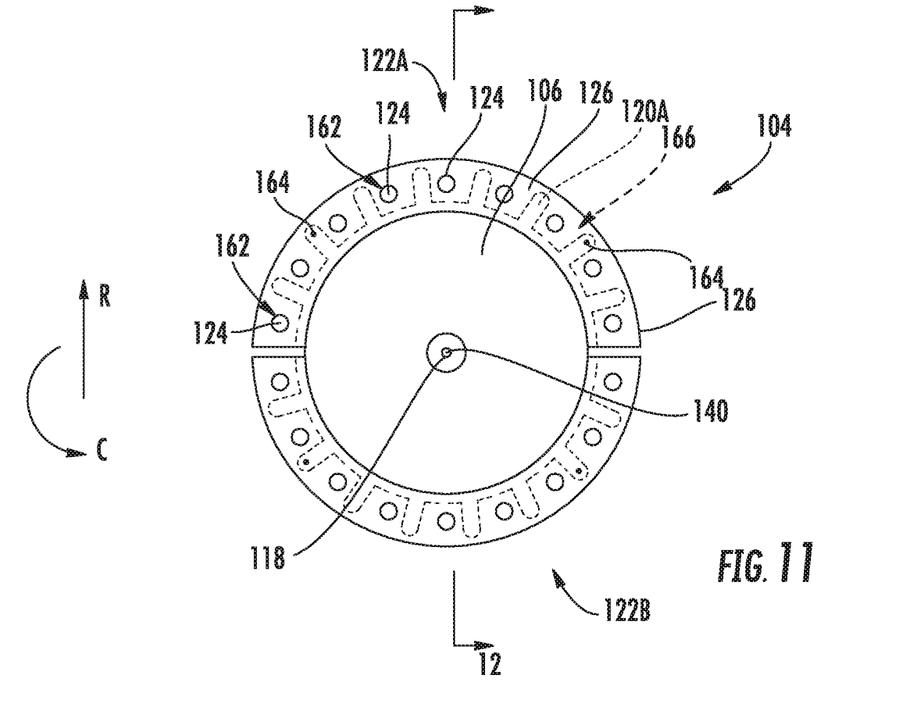
FIG. 11 is a view of a link and a plurality of rope assemblies in accordance with an exemplary embodiment of the present disclosure along a longitudinal direction of the exemplary link.
Figure 12:
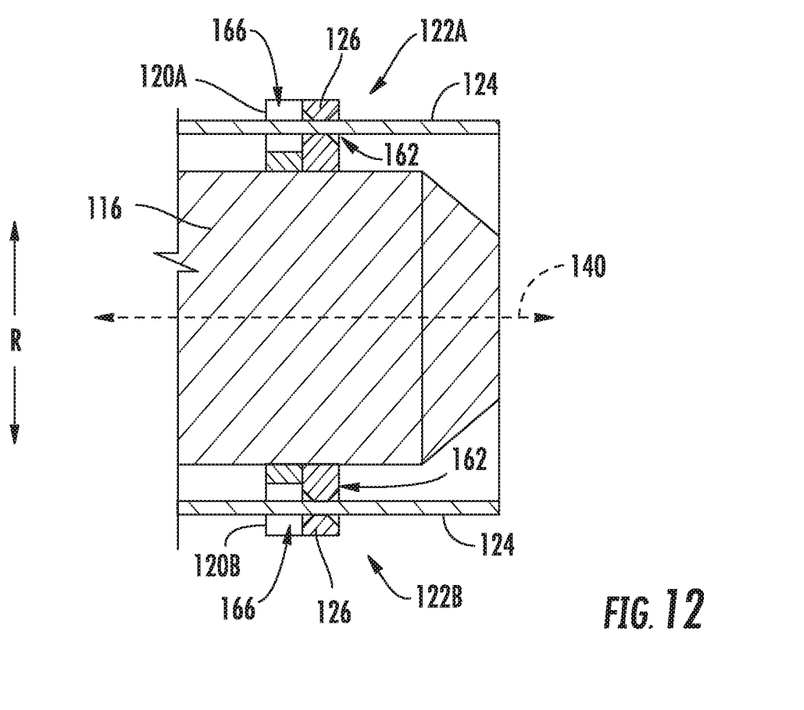
FIG. 12 is a cross-sectional view of the exemplary link and exemplary plurality of rope assemblies of FIG. 11, along Line 12-12 of FIG. 11.

Referring particularly to FIG. 12, providing a cross-sectional view along Line 12-12 of FIG. 11, such a configuration is depicted. As shown, the bearing 126 is positioned adjacent to the first bracket 120A such that the opening 162 depicted with the rope 124 extending therethrough similarly extends through a corresponding slot 166 in the bracket 120. Notably, however, in other embodiments, the bracket 120 may have any other suitable configuration and the bearing 126 may be coupled to the bracket 120 any other suitable manner.

As will also be appreciated, the bearing 126 of the second rope assembly 122B is configured in a similar manner to the bearing 126 of the first rope assembly 122A, such that it accommodates the plurality of ropes 124 circumferentially spaced from one another and is removably attached to a second bracket 120B of the link 116.

In such a manner, the first rope assembly 122A may be installed as a unit on an otherwise assembled robotic arm 104 without requiring each individual rope 124 to be individually installed. Further, in such a manner, in the event of a failure of one or more bearings 126 or ropes 124 of the first rope assembly 122A (or second rope assembly 122B), the entire rope assembly 122 may be replaced in unison without having to, e.g., substantially disassemble the robotic arm 104 and re-thread one or more ropes 124.

Notably, although for the embodiment depicted the first rope assembly 122A and second rope assembly 122B extend substantially 180 degrees about the link 116, in other embodiments, one or more of the rope assemblies 122 may extend less than 180 degrees around the circumference of the link 116, such that more than two rope assemblies 122 may be accommodated.

Figure 13:
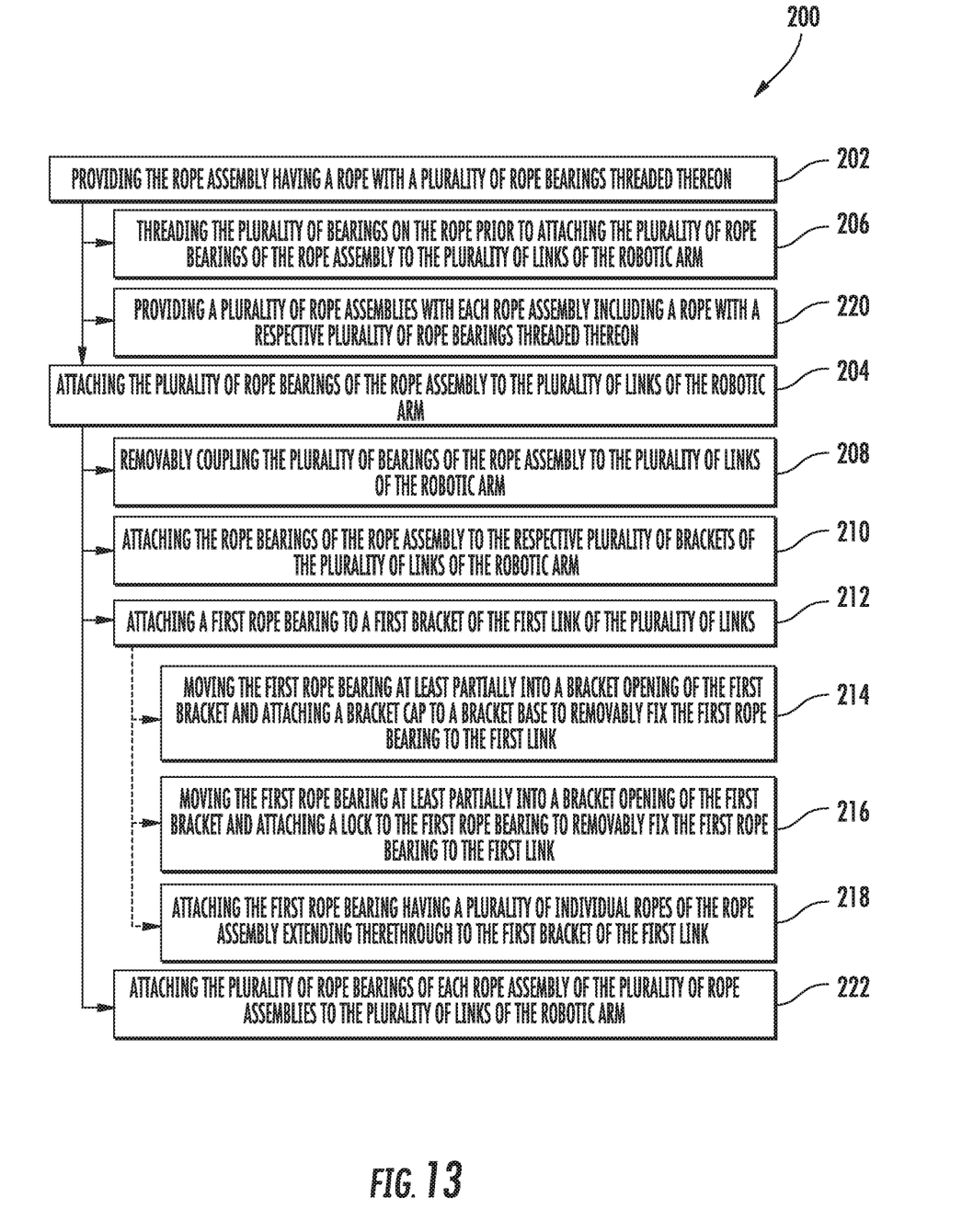
FIG. 13 is a flow diagram of a method for constructing a robotic arm of a robotic arm assembly in accordance with yet another exemplary aspect of the present disclosure.

Referring now to FIG. 13 a method 200 for constructing a robotic arm in accordance with an exemplary aspect of the present disclosure is provided. The method 200 may be utilized to construct one or more the exemplary robotic arms described above with reference to, e.g., FIGS. 1 through 12. Accordingly, the robotic arm may generally include a plurality of links movably coupled to one another and a rope assembly.

For the exemplary aspect depicted, the method 200 generally includes at (202) providing the rope assembly having a rope with a plurality of rope bearings threaded thereon, and at (204) attaching the plurality of rope bearings of the rope assembly to the plurality of links of the robotic arm.

More specifically, it will be appreciated that for the exemplary aspect depicted the rope is a pre-threaded rope (i.e., the rope assembly is provided having a rope with bearings threaded thereon). In such a manner, it will be appreciated that providing the rope assembly, with the rope assembly having the rope with the plurality of rope bearings threaded thereon at (202) includes at (206) threading the plurality of bearings on the rope prior to attaching the plurality of rope bearings of the rope assembly to the plurality of links of the robotic arm at (204). Moreover, it will be appreciated that, as used herein, the term "providing" does not require an original manufacturing of the component, and instead may require only making such component available.

Further, for the exemplary aspect depicted, attaching the plurality of rope bearings of the rope assembly to the plurality of links of the robotic arm at (204) more specifically includes at (208) removably coupling the plurality of bearings of the rope assembly to the plurality of links of the robotic arm. For example, in certain exemplary embodiments, the plurality of links may include a respective plurality of brackets. In such an exemplary aspect, attaching the plurality of rope bearings of the rope assembly to the plurality of links of the robotic arm at (204) includes at (210) attaching the rope bearings of the rope assembly to the respective plurality of brackets of the plurality of links of the robotic arm.

More specifically, for the exemplary aspect depicted, attaching the plurality of rope bearings of the rope assembly to the plurality of links of the robotic arm at (204) includes at (212) attaching a first rope bearing to a first bracket of the first link of the plurality of links. Further, attaching the first rope bearing to the first bracket of the first link of the plurality of links at (212) includes, for the exemplary aspect depicted, at (214) moving the first rope bearing at least partially into a bracket opening of the first bracket and attaching a bracket cap to a bracket base to removably fix the first rope bearing to the first link.

It will be appreciated, however, that in other exemplary aspects, the first rope bearing may be removably attached to the first bracket of the first link in any other suitable manner. For example, as is depicted in phantom, in other exemplary aspects, attaching the first rope bearing to the first bracket of the first link of the plurality of links at (212) may include at (216) moving the first rope bearing at least partially into a bracket opening of the first bracket and attaching a lock to the first rope bearing to removably fix the first rope bearing to the first link.

Additionally, or alternatively, still, it will be appreciated that in certain exemplary aspects, the first rope bearing of the rope assembly may be configured to hold a plurality of ropes of the rope assembly. With such an exemplary aspect, as is also depicted in phantom, attaching the first rope bearing to the first bracket of the first link of the plurality of links at (212) may include at (218) attaching the first rope bearing having a plurality of individual ropes of the rope assembly extending therethrough to the first bracket of the first link.

Referring still to FIG. 13, additional rope assemblies may also be coupled to the plurality of links. For example, for the aspect depicted, providing the rope assembly having the rope with the plurality of rope bearings threaded thereon at (202) includes at (220) providing a plurality of rope assemblies with each rope assembly including a rope with a respective plurality of rope bearings threaded thereon. With such an exemplary aspect, attaching the plurality of rope bearings to the rope assembly to the plurality of links of the robotic arm at (204) includes at (222) attaching the plurality of rope bearings of each rope assembly of the plurality of rope assemblies to the plurality of links of the robotic arm. For example, in certain exemplary aspects, the plurality of rope assemblies may include at least six rope assemblies. Notably, six rope assemblies may allow for multiple degrees of freedom for at least two links of a robotic arm.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for constructing a robotic arm comprising a plurality of links and a rope assembly, the method comprising:
   providing the rope assembly having a rope with a plurality of rope bearings threaded thereon; and
   attaching the plurality of rope bearings of the rope assembly to the plurality of links of the robotic arm.

2. The method of claim 1, wherein providing the rope assembly having the rope with the plurality of rope bearings threaded thereon comprises threading the plurality of rope bearings on the rope prior to attaching the plurality of rope bearings of the rope assembly to the plurality of links of the robotic arm.

3. The method of claim 1, wherein attaching the plurality of rope bearings of the rope assembly to the plurality of links of the robotic arm comprises removably coupling the plurality of rope bearings of the rope assembly to the plurality of links of the robotic arm.

4. The method of claim 1,
wherein providing the rope assembly having the rope with the plurality of rope bearings threaded thereon comprises providing a plurality of rope assemblies, with each rope assembly including a rope with a respective plurality of rope bearings threaded thereon, and
wherein attaching the plurality of rope bearings of the rope assembly to the plurality of links of the robotic arm comprises attaching the plurality of rope bearings of each rope assembly of the plurality of rope assemblies to the plurality of links of the robotic arm.

5. The method of claim 4, wherein the plurality of rope assemblies comprises at least 6 rope assemblies.

6. The method of claim 1,
wherein the plurality of links comprises a forward link and an aft link,
wherein the forward link includes a bracket,
wherein the aft link also includes a bracket, and
wherein attaching the plurality of rope bearings of the rope assembly to the plurality of links of the robotic arm includes attaching a first rope bearing to the bracket of the forward link, and attaching a second rope bearing to the bracket of the aft link.

7. The method of claim 1,
wherein the rope includes an anchor fixedly coupled to an end of the rope, and
wherein the method further comprises attaching the anchor to one link of the plurality of links.

8. The method of claim 1,
wherein the plurality of links comprise a respective plurality of brackets,
wherein attaching the plurality of rope bearings of the rope assembly to the plurality of links of the robotic arm comprises attaching the rope bearings of the rope assembly to the respective plurality of brackets of the plurality of links.

9. The method of claim 1, wherein attaching the plurality of rope bearings of the rope assembly to the plurality of links of the robotic arm comprises attaching a first rope bearing to a first bracket of a first link of the plurality of links.

10. The method of claim 9, wherein attaching the first rope bearing to the first bracket of the first link of the plurality of links comprises moving the first rope bearing at least partially into a bracket opening of the first bracket and attaching a bracket cap to a bracket base to removably couple the first rope bearing to the first link.

11. The method of claim 9, wherein attaching the first rope bearing to the first bracket of the first link of the plurality of links includes moving the first rope bearing at least partially into a bracket opening of the first bracket and attaching a lock to the first rope bearing to removably couple the first rope bearing to the first link.

12. The method of claim 9,
wherein the rope assembly includes a plurality of ropes extending through the first rope bearing, and
wherein attaching the first rope bearing to the first bracket of the first link of the plurality of links includes attaching the first rope bearing having the plurality of ropes of the rope assembly extending therethrough to the first bracket of the first link.

13. A robotic arm assembly comprising:
a robotic arm comprising:
a plurality of links moveably coupled to one another, the plurality of links collectively comprising a plurality of brackets; and
a rope assembly comprising a rope and a plurality of bearings threaded thereon,
wherein each bearing of the plurality of bearings is removably coupled to and in contact with one bracket of the plurality of brackets of the plurality of links.

14. The robotic arm assembly of claim 13,
wherein each link extends between a forward end and an aft end, and
wherein the plurality of brackets includes a forward bracket at the forward end of each link and an aft bracket at the aft end of each link.

15. The robotic arm assembly of claim 13,
wherein the plurality of links includes a first link,
wherein the plurality of brackets of the plurality of links includes a forward bracket positioned at a forward end of the first link,
wherein the forward bracket defines a forward bracket opening,
wherein a first bearing of the plurality of bearings of the rope assembly is positioned within the forward bracket opening.

16. The robotic arm assembly of claim 15,
wherein the forward bracket comprises a cap and a base,
wherein the base defines at least in part the forward bracket opening, and
wherein the cap is removably coupled to the base for removably coupling the first bearing to the forward bracket.

17. The robotic arm assembly of claim 15,
wherein the first bearing comprises a body and a lock,
wherein the lock is removably coupled to the body for removably coupling the first bearing to the forward bracket.

18. The robotic arm assembly of claim 15,
wherein the bracket defines a plurality of bracket openings, and
wherein the robotic arm further comprises a plurality of rope assemblies,
wherein each rope assembly includes a bearing removably positioned in one of the plurality of bracket openings of the bracket.

19. The robotic arm assembly of claim 13,
wherein the rope assembly includes a plurality of ropes,
wherein the plurality of links includes a first link defining a circumferential direction,
wherein the plurality of brackets includes a first bracket positioned on the first link and defining a plurality of openings spaced along the circumferential direction, and
wherein the plurality of ropes extend through the plurality of openings of the first bracket.

20. A robotic arm comprising:
a plurality of links moveably coupled to one another, the plurality of links collectively comprising a plurality of brackets, and
a rope assembly comprising a rope and a plurality of bearings threaded thereon,
wherein each bearing of the plurality of bearings is removably coupled to one bracket of the plurality of brackets of the plurality of links,
wherein the plurality of links includes a first link, wherein the plurality of brackets of the plurality of links includes a forward bracket positioned at a forward end of the first link, wherein the forward bracket defines a forward bracket opening, wherein a first bearing of the plurality of bearings of the rope assembly is positioned within the forward bracket opening, wherein the first bearing comprises a body and a lock, wherein the lock is removably coupled to the body for removably coupling the first bearing to the forward bracket, wherein the body of the first bearing extends between a first end and a second end, wherein the body of the first bearing includes a head at the first end and defines a groove at the second end, and wherein the lock is removably positioned within the groove.

\* \* \* \* \*